Nov. 4, 1924.                                              1,514,358
                    R. M. WILLIS ET AL
                         COUPLING
                    Filed June 16, 1921
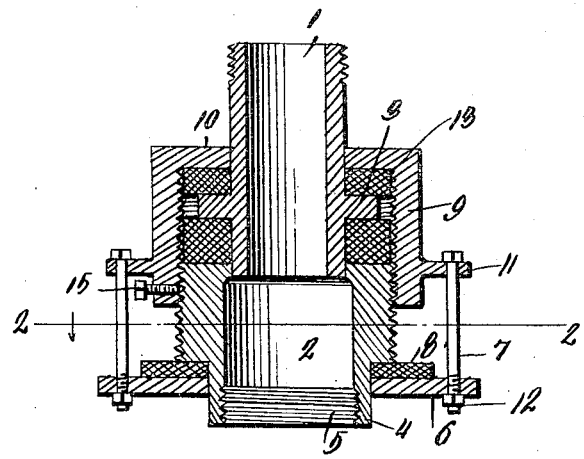
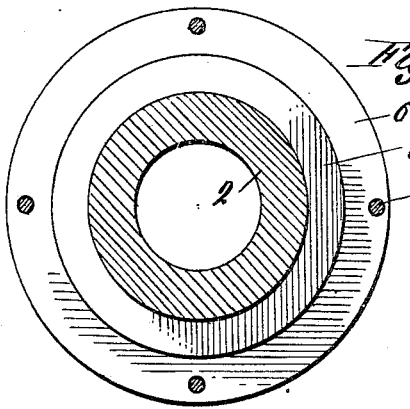
WITNESSES                      REUBEN M. WILLIS    INVENTORS
                               CARTER A. WILLIS
                                    BY
                                               ATTORNEY.

Patented Nov. 4, 1924.

1,514,358

UNITED STATES PATENT OFFICE.

REUBEN M. WILLIS AND CARTER A. WILLIS, OF CHANUTE, KANSAS.

COUPLING.

Application filed June 16, 1921. Serial No. 478,030.

*To all whom it may concern:*

Be it known that we, REUBEN M. WILLIS and CARTER A. WILLIS, citizens of the United States, residing at Chanute, in the county of Neosho and State of Kansas, have invented certain new and useful Improvements in a Coupling, of which the following is a specification.

This invention relates to a coupling and has for its principal object to provide means for connecting the ends of pipes which are adapted to contain or have passing therethrough a liquid under high pressure, said coupling preventing any leakage of the liquid.

Another object of the invention is to generally improve upon couplings of this character by providing a device which will be of extremely simple, durable and inexpensive construction, one which is efficient and reliable in operation, and well adapted to the purpose for which it is designed.

With these and numerous other objects in view, the invention relates to certain novel features of construction, and the combination and arrangement of parts as will be hereinafter fully described and claimed.

In the drawing:—

Figure 1 is a longitudinal section taken through the coupling, and

Figure 2 is a section taken on the line 2—2 of Figure 1 looking in the direction of the arrow.

Referring to the drawing in detail it will be seen that 1 designates the male member of the coupling while 2 designates the female member of the coupling. The male member is adapted to be received in one end of the female member as shown to advantage in Figure 1. The male member is constructed so as to be provided with an annular rib 3 situated a relatively short distance from its end which fits within the female member 2. The other end of the male member 1 may be threaded so as to be connected to a pipe in the usual manner. As will be noted in Figure 1 the female member 2 is made so that its walls are thicker than the walls of the male member and are provided with threads upon its outer periphery throughout the major portion thereof. The end of the female member opposite the wall member is reduced as indicated at 4 and this reduced end is provided with internal threads 5 so as to receive a pipe in the manner well known in the art. This reduced portion 4 forms a shoulder against which a washer element will bear. This washer element is in the form of a disk 6 having a centrally located aperture for receiving the reduced portion 4 and a plurality of apertures adjacent its periphery for receiving bolts 7. A gasket 8 is preferably disposed between the shoulder on the female member and the washer or retaining elements 6.

A sleeve 9 provided with internal threads for receiving the external threads on the female member is provided with a flange 10 which fits snugly over the male member 1 and an annular rib 11 adjacent its end which rib is provided with a plurality of apertures for receiving the bolts 7. As the bolts 7 are tightened by means of their nuts 12 the flange 10 will engage the rib 6 thus drawing the male member 1 into the female member 2. A pair of gaskets 13 are disposed in the sleeve 9 so as to be situated one on each side of the rib 3 and thus as the sleeve 9 is screwed tightly on the female member 2 any tendency for leakage will be efficiently obviated and the bolts 7 will also prevent all the strain from being on the internal threads of the sleeve and external threads of the female member. A locking mechanism is provided so as to prevent the accidental rotation of the sleeve 9 in relation to the female member 2 and this consists of a set screw 15 passing through the sleeve 9 and engaging the external threads on the female member 2.

From the foregoing description taken in connection with the accompanying drawings, the construction and operation of the coupling will be readily understood without a more extended explanation. As numerous changes in form, proportion, and in the minor details of construction may be resorted to without departing from the spirit of this invention we do not wish to be limited to the construction herein shown and described other than as claimed.

Having thus described our invention what we claim as new is:—

1. In a coupling of the class described, an inner member, an outer member partially disposed over the inner member, an annular rib on the outside of the inner member, said rib being spaced from the outer member, washers one on each side of the rib, a sleeve threaded over the outer member provided with an inwardly extending annular flange engaging the inner member for holding one washer tightly against the rib and the other firmly between the rib and an end of the outer member, said outer member provided with a reduced portion, a ring disk and a gasket positioned on the reduced portion, a rim formed on the sleeve and a plurality of bolts engaging the rim and the disk.

2. In a coupling of the class described, an inner member, an outer member partially disposed over the inner member, an annular rib on the outside of the inner member, said rib being spaced from the outer member, washers one on each side of the rib, a sleeve threaded over the outer member provided with an inwardly extending annular flange engaging the inner member for holding one washer tightly against the rib and the other firmly between the rib and an end of the outer member, said outer member provided with a reduced portion, a ring disk and a gasket positioned on the reduced portion, a rim formed on the sleeve, a plurality of bolts engaging the rim and the disk, and a screw threaded through the sleeve and engaging the outer member for locking the sleeve on the outer member.

In testimony whereof we affix our signatures in presence of two witnesses.

REUBEN M. WILLIS.
CARTER A. WILLIS.

Witnesses:
GEO. K. BIDSON,
JOHN R. TYE.